US011983988B2

(12) United States Patent
Huke et al.

(10) Patent No.: US 11,983,988 B2
(45) **Date of Patent: *May 14, 2024**

(54) AI SPORTS BETTING ALGORITHMS ENGINE

(71) Applicant: AdrenalineIP, Washington, DC (US)

(72) Inventors: Casey Alexander Huke, Washington, DC (US); John Cronin, Jericho, VT (US); Joseph W. Beyers, Saratoga, CA (US); Michael D'Andrea, Burlington, VT (US)

(73) Assignee: AdrenalineIP, Washington, DC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/406,407

(22) Filed: Aug. 19, 2021

(65) Prior Publication Data

US 2022/0148364 A1 May 12, 2022

Related U.S. Application Data

(63) Continuation of application No. 17/102,832, filed on Nov. 24, 2020, now Pat. No. 11,100,753.

(60) Provisional application No. 63/111,208, filed on Nov. 9, 2020.

(51) Int. Cl.

| | |
|---|---|
| ***A63F 9/24*** | (2006.01) |
| ***A63F 11/00*** | (2006.01) |
| ***G06F 13/00*** | (2006.01) |
| ***G06F 17/00*** | (2019.01) |
| ***G07F 17/32*** | (2006.01) |

(52) U.S. Cl.

CPC ........ *G07F 17/323* (2013.01); *G07F 17/3288* (2013.01)

(58) Field of Classification Search

CPC ............................ G07F 17/32; G07F 17/3214
USPC ............................ 463/1, 20, 22, 25, 30, 39
See application file for complete search history.

(56) References Cited

U.S. PATENT DOCUMENTS

| | | | |
|---|---|---|---|
| 2018/0330281 A1 | 11/2018 | Teller et al. | |
| 2019/0251794 A1* | 8/2019 | Simon | G07F 17/3288 |
| 2020/0111325 A1 | 4/2020 | Lockton et al. | |

(Continued)

FOREIGN PATENT DOCUMENTS

WO 2020076657 A1 4/2020

OTHER PUBLICATIONS

International Search Report and Written Opinion dated Dec. 10, 2021 in corresponding International Application No. PCT/US2021/058569; 7 pages.

*Primary Examiner* — Adetokunbo O Torimiro
(74) *Attorney, Agent, or Firm* — Maier & Maier, PLLC

(57) ABSTRACT

This invention is an engine that allows, for any play in an "in play" or single play betting game, that both calculates "basic odds" (calculated by using historical database mining) and at least one more odds making formula to calculate odds on at least one outcome of a single play in a live event, crossing at least two different odds making formulas to create crossed odds. Then utilizes artificial intelligence to correlate the crossed odds with the final odds on similar historical plays in which odds were calculated. Then utilizes machine learning after the outcome of the play is known to correlate the odds generated by each odds making formula with the most profitable odds calculated on previous similar plays.

11 Claims, 4 Drawing Sheets

Content - High Level Diagram

(56) References Cited

U.S. PATENT DOCUMENTS

2020/0302745 A1 * 9/2020 Merati ................ G07F 17/3227

* cited by examiner

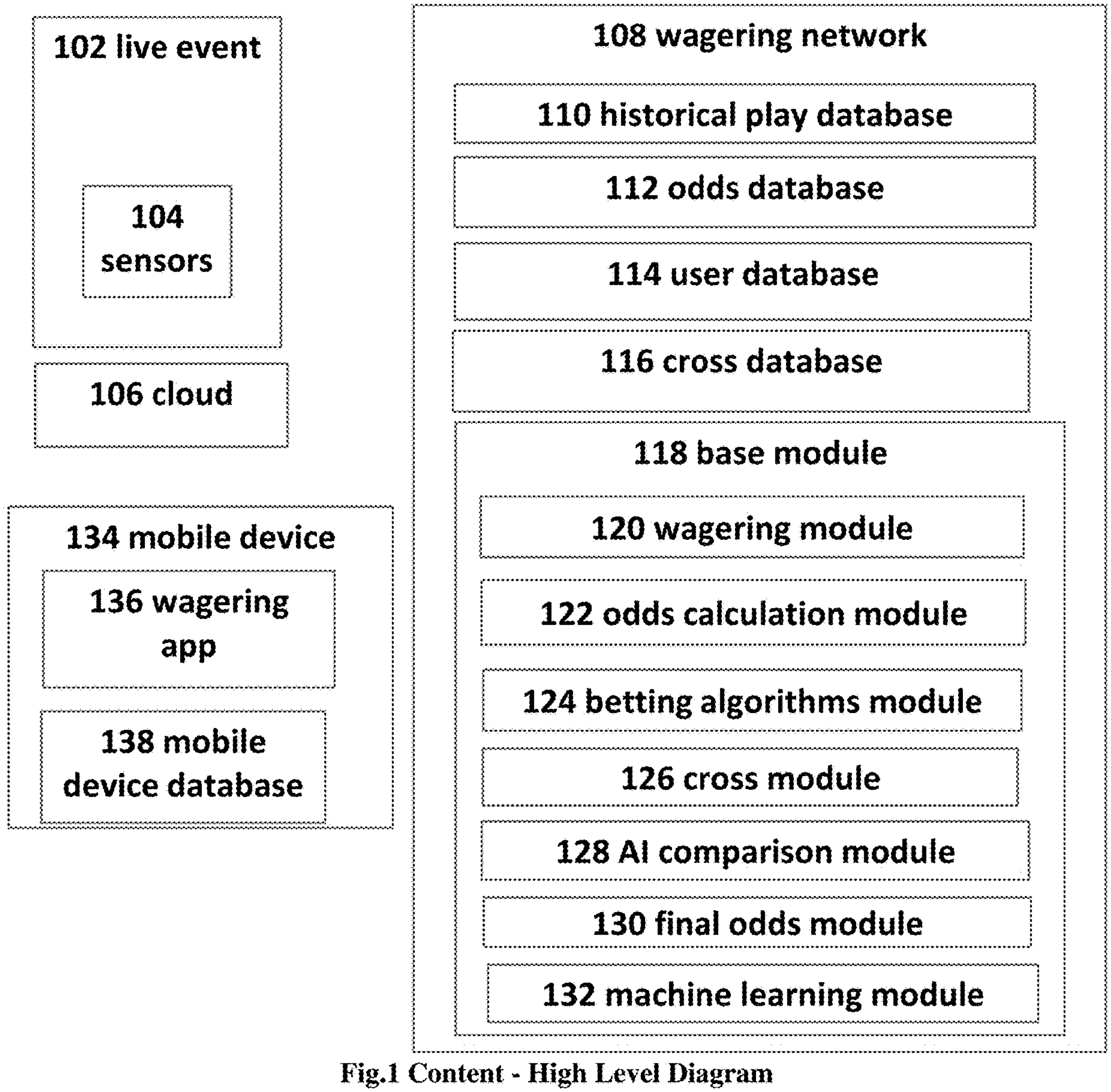
Fig.1 Content - High Level Diagram

| Formulas - Play ID NEGB35 | Formula Odds | Correlation Coefficient | Primary Odds Calculation | Primary Value Betting | Primary Betting Arbitrage | Betting Bank | Unit Stakes | Kelly's Criterion | Monte Carlo Simulation |
|---|---|---|---|---|---|---|---|---|---|
| Monte Carlo Simulation | +400 | 0.65 | +350/0.69 | +375/0.72 | +300/0.66 | +325/0.54 | +363/0.72 | +375/0.60 | |
| Kelly's Criterion | +350 | 0.55 | +325/0.63 | +350/0.55 | +275/0.61 | +300/0.48 | +337/0.71 | | |
| Unit Stakes | +325 | 0.82 | +313/0.79 | +337/0.70 | +266/0.58 | +280/0.62 | | | |
| Betting Bank | +250 | 0.42 | +275/0.58 | +300/0.50 | +225/0.55 | | | | |
| Primary Betting Arbitrage | +200 | 0.67 | +250/0.72 | +275/0.61 | | | | | |
| Primary Value Betting | +350 | 0.55 | +325/0.60 | | | | | | |
| Primary Odds Calculation | +300 | 0.75 | | | | | | | |
| Final Odds | +313 | | | | | | | | |

Fig.2 cross database Data Content

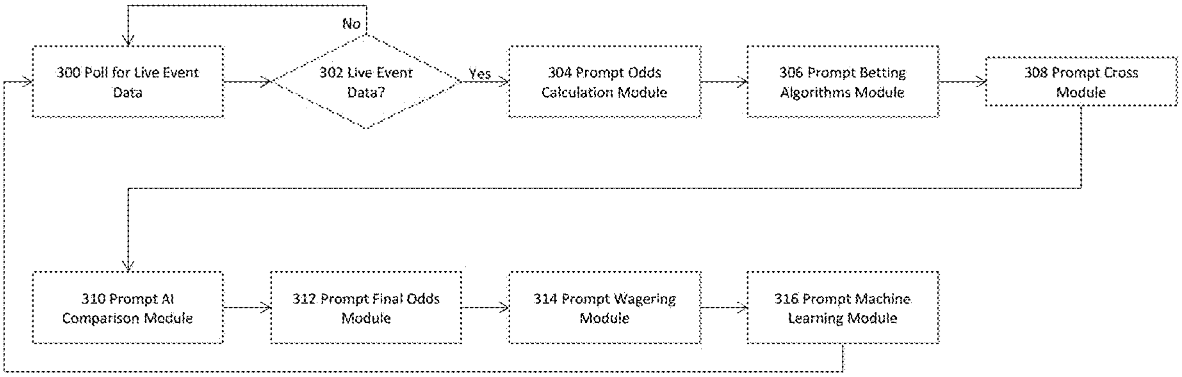

Fig.3 base module Object Content

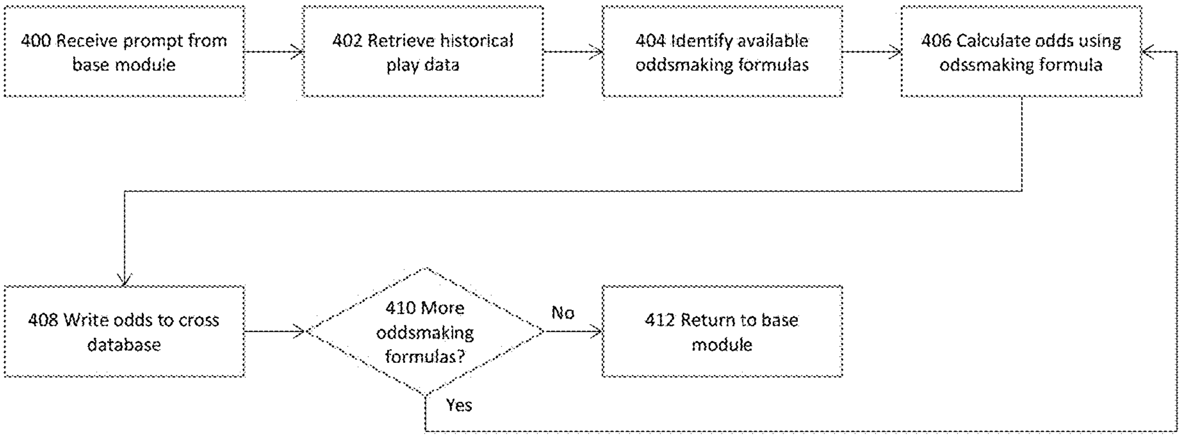

Fig.4 betting algorithms module Object Content

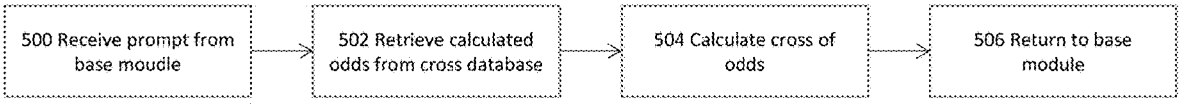
Fig.5 cross module Object Content
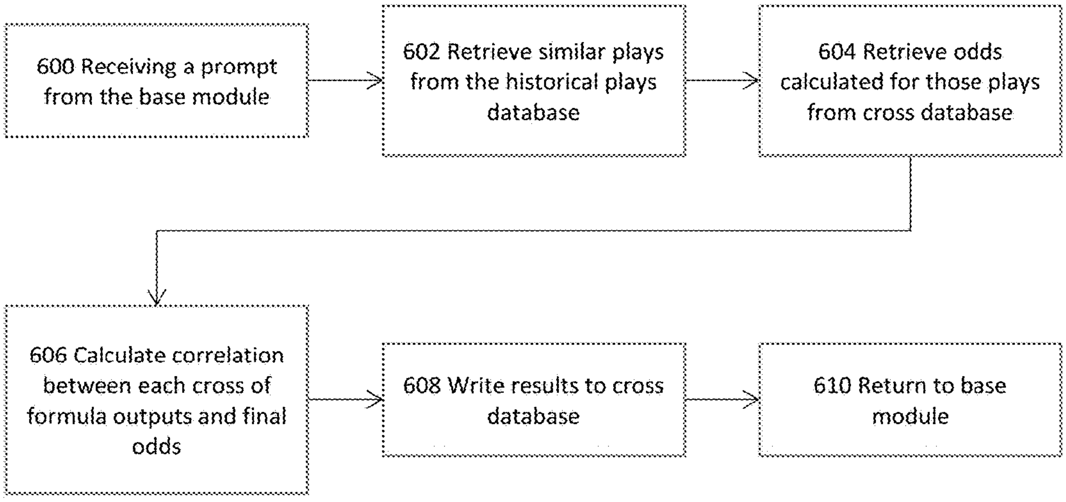
Fig.6 AI comparison module Object Content
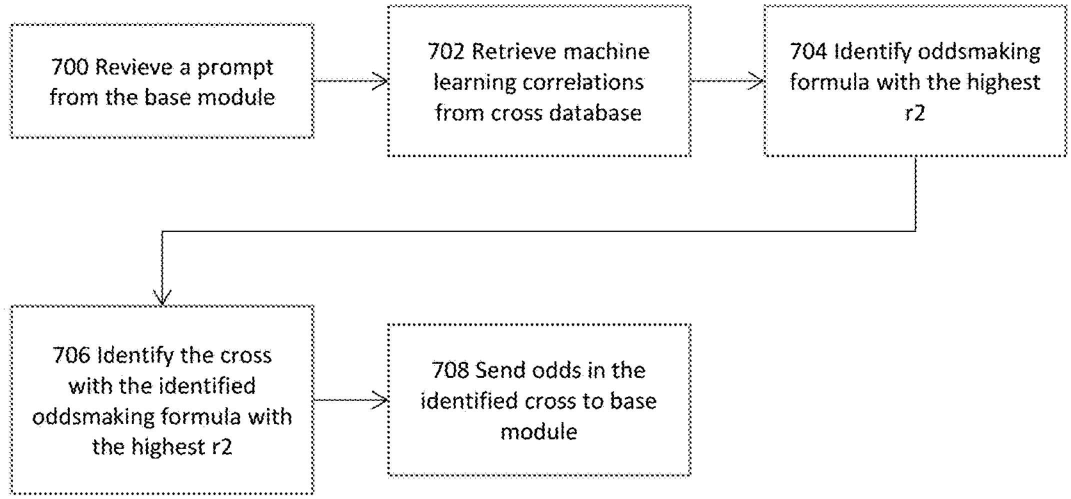
Fig.7 final odds module Object Content

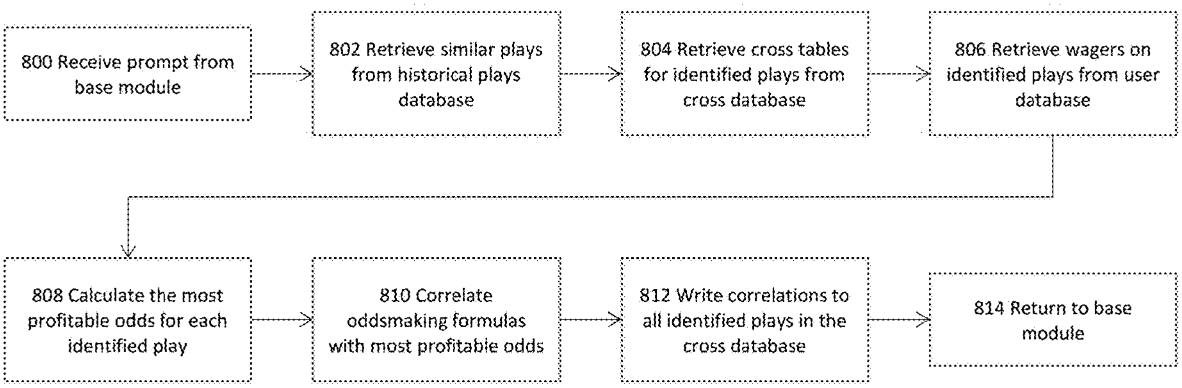
Fig.8 machine learning module Object Content

AI SPORTS BETTING ALGORITHMS ENGINE

CROSS-REFERENCE TO RELATED APPLICATIONS

The present patent application claims benefit and priority to U.S. patent application Ser. No. 17/102,832 filed on Nov. 24, 2020, and U.S. Provisional Patent Application No. 63/111,208 filed on Nov. 9, 2020, which is hereby incorporated by reference into the present disclosure.

FIELD

The embodiments are generally related to gambling on individual plays inside of a live sporting event and the odds calculations related to that.

BACKGROUND

There are numerous ways to calculate odds on the potential outcomes of a single play in a sporting event. Determining the proper odd making formula to use in a given context is an important choice for a sportsbook to make. Formulas could be, for example, formulas that are in and of themselves computer program modules designed to find profitable sports betting opportunities. These programs use vast amounts of data from past sporting matches so as to identify patterns, which can then be used to calculate the probability of certain sporting outcomes. In most cases, primary betting algorithms calculate the probability of various outcomes, and compare those probabilities to the odds offered by bookmakers, so as to identify bets that are worth placing.

Betting lines are not designed to reflect the real and accurate probability of either outcome. Users attempt to gain an edge over sportsbooks by making a wager when they think there is a discrepancy between the real probability of an event and the implied probability determined from a betting line. Contemporary odds making is just as much a risk management proposition as it is a method of predicting the outcome of sporting events.

BRIEF DESCRIPTIONS OF THE DRAWINGS

The accompanying drawings illustrate various embodiments of systems, methods, and various other aspects of the embodiments. Any person with ordinary skills in the art will appreciate that the illustrated element boundaries (e.g. boxes, groups of boxes, or other shapes) in the figures represent an example of the boundaries. It may be understood that, in some examples, one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 1 illustrates an AI sports betting algorithms engine, according to an embodiment.

FIG. 2 illustrates a cross database, according to an embodiment.

FIG. 3 illustrates a base module, according to an embodiment.

FIG. 4 illustrates a betting algorithms module, according to an embodiment.

FIG. 5 illustrates a cross module, according to an embodiment.

FIG. 6 illustrates an AI comparison module, according to an embodiment.

FIG. 7 illustrates a final odds module, according to an embodiment.

FIG. 8 illustrates a machine learning module, according to an embodiment.

DETAILED DESCRIPTION

Aspects of the present invention are disclosed in the following description and related figures directed to specific embodiments of the invention. Those of ordinary skill in the art will recognize that alternate embodiments may be devised without departing from the spirit or the scope of the claims. Additionally, well-known elements of exemplary embodiments of the invention will not be described in detail or will be omitted so as not to obscure the relevant details of the invention As used herein, the word exemplary means serving as an example, instance or illustration. The embodiments described herein are not limiting, but rather are exemplary only. It should be understood that the described embodiments are not necessarily to be construed as preferred or advantageous over other embodiments. Moreover, the terms embodiments of the invention, embodiments or invention do not require that all embodiments of the invention include the discussed feature, advantage, or mode of operation.

Further, many of the embodiments described herein are described in terms of sequences of actions to be performed by, for example, elements of a computing device. It should be recognized by those skilled in the art that the various sequence of actions described herein can be performed by specific circuits (e.g., application specific integrated circuits (ASICs)) and/or by program instructions executed by at least one processor. Additionally, the sequence of actions described herein can be embodied entirely within any form of computer-readable storage medium such that execution of the sequence of actions enables the processor to perform the functionality described herein. Thus, the various aspects of the present invention may be embodied in a number of different forms, all of which have been contemplated to be within the scope of the claimed subject matter. In addition, for each of the embodiments described herein the corresponding form of any such embodiments may be described herein as, for example, a computer configured to perform the described action.

With respect to the embodiments, a summary of terminology used herein is provided.

An action refers to a specific play or specific movement in a sporting event. For example, an action may determine which players were involved during a sporting event. In some embodiments, an action may be a throw, shot, pass, swing, kick, hit, performed by a participant in a sporting event. In some embodiments, an action may be a strategic decision made by a participant in the sporting event such as a player, coach, management, etc. In some embodiments, an action may be a penalty, foul, or type of infraction occurring in a sporting event. In some embodiments, an action may include the participants of the sporting event. In some embodiments, an action may include beginning events of sporting event, for example opening tips, coin flips, opening pitch, national anthem singers, etc. In some embodiments, a sporting event may be football, hockey, basketball, baseball, golf, tennis, soccer, cricket, rugby, MMA, boxing, swimming, skiing, snowboarding, horse racing, car racing, boat racing, cycling, wrestling, Olympic sport, eSports, etc. Actions can be integrated into the embodiments in a variety of manners.

A "bet" or "wager" is to risk something, usually a sum of money, against someone else's or an entity on the basis of the outcome of a future event, such as the results of a game or event. It may be understood that non-monetary items may be the subject of a "bet" or "wager" as well, such as points or anything else that can be quantified for a "wager" or "bet." A bettor refers to a person who bets or wagers. A bettor may also be referred to as a user, client, or participant throughout the present invention. A "bet" or "wager" could be made for obtaining or risking a coupon or some enhancements to the sporting event, such as better seats, VIP treatment, etc. A "bet" or "wager" can be done for certain amount or for a future time. A "bet" or "wager" can be done for being able to answer a question correctly. A "bet" or "wager" can be done within a certain period of time. A "bet" or "wager" can be integrated into the embodiments in a variety of manners.

A "book" or "sportsbook" refers to a physical establishment that accepts bets on the outcome of sporting events. A "book" or "sportsbook" system enables a human working with a computer to interact, according to set of both implicit and explicit rules, in an electronically powered domain for the purpose of placing bets on the outcome of sporting event. An added game refers to an event not part of the typical menu of wagering offerings, often posted as an accommodation to patrons. A "book" or "sportsbook" can be integrated into the embodiments in a variety of manners.

To "buy points" means a player pays an additional price (more money) to receive a half-point or more in the player's favor on a point spread game. Buying points means you can move a point spread, for example up to two points in your favor. "Buy points" can be integrated into the embodiments in a variety of manners.

The "price" refers to the odds or point spread of an event. To "take the price" means betting the underdog and receiving its advantage in the point spread. "Price" can be integrated into the embodiments in a variety of manners.

"No action" means a wager in which no money is lost or won, and the original bet amount is refunded. "No action" can be integrated into the embodiments in a variety of manners.

The "sides" are the two teams or individuals participating in an event: the underdog and the favorite. The term "favorite" refers to the team considered most likely to win an event or game. The "chalk" refers to a favorite, usually a heavy favorite. Bettors who like to bet big favorites are referred to "chalk eaters" (often a derogatory term). An event or game in which the sports book has reduced its betting limits, usually because of weather or the uncertain status of injured players is referred to as a "circled game." "Laying the points or price" means betting the favorite by giving up points. The term "dog" or "underdog" refers to the team perceived to be most likely to lose an event or game. A "longshot" also refers to a team perceived to be unlikely to win an event or game. "Sides", "favorite", "chalk", "circled game", "laying the points price", "dog" and "underdog" can be integrated into the embodiments in a variety of manners.

The "money line" refers to the odds expressed in terms of money. With money odds, whenever there is a minus (−) the player "lays" or is "laying" that amount to win (for example $100); where there is a plus (+) the player wins that amount for every $100 wagered. A "straight bet" refers to an individual wager on a game or event that will be determined by a point spread or money line. The term "straight-up" means winning the game without any regard to the "point spread"; a "money-line" bet. "Money line", "straight bet", "straight-up" can be integrated into the embodiments in a variety of manners.

The "line" refers to the current odds or point spread on a particular event or game. The "point spread" refers to the margin of points in which the favored team must win an event by to "cover the spread." To "cover" means winning by more than the "point spread". A handicap of the "point spread" value is given to the favorite team so bettors can choose sides at equal odds. "Cover the spread" means that a favorite win an event with the handicap considered or the underdog wins with additional points. To "push" refers to when the event or game ends with no winner or loser for wagering purposes, a tie for wagering purposes. A "tie" is a wager in which no money is lost or won because the teams' scores were equal to the number of points in the given "point spread". The "opening line" means the earliest line posted for a particular sporting event or game. The term "pick" or "pick 'em" refers to a game when neither team is favored in an event or game. "Line", "cover the spread", "cover", "tie", "pick" and "pick-em" can be integrated into the embodiments in a variety of manners.

To "middle" means to win both sides of a game; wagering on the "underdog" at one point spread and the favorite at a different point spread and winning both sides. For example, if the player bets the underdog +4½ and the favorite −3½ and the favorite wins by 4, the player has middled the book and won both bets. "Middle" can be integrated into the embodiments in a variety of manners.

Digital gaming refers to any type of electronic environment that can be controlled or manipulated by a human user for entertainment purposes. A system that enables a human and a computer to interact according to set of both implicit and explicit rules, in an electronically powered domain for the purpose of recreation or instruction. "eSports" refers to a form of sports competition using video games, or a multiplayer video game played competitively for spectators, typically by professional gamers. Digital gaming and "eSports" can be integrated into the embodiments in a variety of manners.

The term event refers to a form of play, sport, contest, or game, especially one played according to rules and decided by skill, strength, or luck. In some embodiments, an event may be football, hockey, basketball, baseball, golf, tennis, soccer, cricket, rugby, MMA, boxing, swimming, skiing, snowboarding, horse racing, car racing, boat racing, cycling, wrestling, Olympic sport, etc. Event can be integrated into the embodiments in a variety of manners.

The "total" is the combined number of runs, points or goals scored by both teams during the game, including overtime. The "over" refers to a sports bet in which the player wagers that the combined point total of two teams will be more than a specified total. The "under" refers to bets that the total points scored by two teams will be less than a certain figure. "Total", "over", and "under" can be integrated into the embodiments in a variety of manners.

A "parlay" is a single bet that links together two or more wagers; to win the bet, the player must win all the wagers in the "parlay". If the player loses one wager, the player loses the entire bet. However, if he wins all the wagers in the "parlay", the player wins a higher payoff than if the player had placed the bets separately. A "round robin" is a series of parlays. A "teaser" is a type of parlay in which the point spread, or total of each individual play is adjusted. The price of moving the point spread (teasing) is lower payoff odds on winning wagers. "Parlay", "round robin", "teaser" can be integrated into the embodiments in a variety of manners.

A "prop bet" or "proposition bet" means a bet that focuses on the outcome of events within a given game. Props are often offered on marquee games of great interest. These include Sunday and Monday night pro football games, various high-profile college football games, major college bowl games and playoff and championship games. An example of a prop bet is "Which team will score the first touchdown?" "Prop bet" or "proposition bet" can be integrated into the embodiments in a variety of manners.

A "first-half bet" refers to a bet placed on the score in the first half of the event only and only considers the first half of the game or event. The process in which you go about placing this bet is the same process that you would use to place a full game bet, but as previously mentioned, only the first half is important to a first-half bet type of wager. A "half-time bet" refers to a bet placed on scoring in the second half of a game or event only. "First-half-bet" and "half-time-bet" can be integrated into the embodiments in a variety of manners.

A "futures bet" or "future" refers to the odds that are posted well in advance on the winner of major events, typical future bets are the Pro Football Championship, Collegiate Football Championship, the Pro Basketball Championship, the Collegiate Basketball Championship, and the Pro Baseball Championship. "Futures bet" or "future" can be integrated into the embodiments in a variety of manners.

The "listed pitchers" is specific to a baseball bet placed only if both of the pitchers scheduled to start a game actually start. If they don't, the bet is deemed "no action" and refunded. The "run line" in baseball, refers to a spread used instead of the money line. "Listed pitchers" and "no action" and "run line" can be integrated into the embodiments in a variety of manners.

The term "handle" refers to the total amount of bets taken. The term "hold" refers to the percentage the house wins. The term "juice" refers to the bookmaker's commission, most commonly the 11 to 10 bettors lay on straight point spread wagers: also known as "vigorish" or "vig". The "limit" refers to the maximum amount accepted by the house before the odds and/or point spread are changed. "Off the board" refers to a game in which no bets are being accepted. "Handle", "juice", vigorish", "vig" and "off the board" can be integrated into the embodiments in a variety of manners.

"Casinos" are a public room or building where gambling games are played. "Racino" is a building complex or grounds having a racetrack and gambling facilities for playing slot machines, blackjack, roulette, etc. "Casino" and "Racino" can be integrated into the embodiments in a variety of manners.

Customers are companies, organizations or individual that would deploy, for fees, and may be part of, of perform, various system elements or method steps in the embodiments.

Managed service user interface service is a service that can help customers (1) manage third parties, (2) develop the web, (3) do data analytics, (4) connect thru application program interfaces and (4) track and report on player behaviors. A managed service user interface can be integrated into the embodiments in a variety of manners.

Managed service risk management services are a service that assists customers with (1) very important person management, (2) business intelligence, and (3) reporting. These managed service risk management services can be integrated into the embodiments in a variety of manners.

Managed service compliance service is a service that helps customers manage (1) integrity monitoring, (2) play safety, (3) responsible gambling and (4) customer service assistance. These managed service compliance services can be integrated into the embodiments in a variety of manners.

Managed service pricing and trading service is a service that helps customers with (1) official data feeds, (2) data visualization and (3) land based, on property digital signage. These managed service pricing and trading services can be integrated into the embodiments in a variety of manners.

Managed service and technology platform are services that helps customers with (1) web hosting, (2) IT support and (3) player account platform support. These managed service and technology platform services can be integrated into the embodiments in a variety of manners.

Managed service and marketing support services are services that help customers (1) acquire and retain clients and users, (2) provide for bonusing options and (3) develop press release content generation. These managed service and marketing support services can be integrated into the embodiments in a variety of manners.

Payment processing services are those services that help customers that allow for (1) account auditing and (2) withdrawal processing to meet standards for speed and accuracy. Further, these services can provide for integration of global and local payment methods. These payment processing services can be integrated into the embodiments in a variety of manners.

Engaging promotions allow customers to treat your players to free bets, odds boosts, enhanced access and flexible cashback to boost lifetime value. Engaging promotions can be integrated into the embodiments in a variety of manners.

"Cash out" or "pay out" or "payout" allow customers to make available, on singles bets or accumulated bets with a partial cash out where each operator can control payouts by managing commission and availability at all times. The "cash out" or "pay out" or "payout" can be integrated into the embodiments in a variety of manners, including both monetary and non-monetary payouts, such as points, prizes, promotional or discount codes, and the like.

"Customized betting" allows customers to have tailored personalized betting experiences with sophisticated tracking and analysis of players' behavior. "Customized betting" can be integrated into the embodiments in a variety of manners.

Kiosks are devices that offer interactions with customers clients and users with a wide range of modular solutions for both retail and online sports gaming. Kiosks can be integrated into the embodiments in a variety of manners.

Business Applications are an integrated suite of tools for customers to manage the everyday activities that drive sales, profit, and growth, from creating and delivering actionable insights on performance to help customers to manage the sports gaming. Business Applications can be integrated into the embodiments in a variety of manners.

State based integration allows for a given sports gambling game to be modified by states in the United States or countries, based upon the state the player is in, based upon mobile phone or other geolocation identification means. State based integration can be integrated into the embodiments in a variety of manners.

Game Configurator allow for configuration of customer operators to have the opportunity to apply various chosen or newly created business rules on the game as well as to parametrize risk management. Game configurator can be integrated into the embodiments in a variety of manners.

"Fantasy sports connector" are software connectors between method steps or system elements in the embodiments that can integrate fantasy sports. Fantasy sports allow a competition in which participants select imaginary teams from among the players in a league and score points according to the actual performance of their players. For example, if a player in a fantasy sports is playing at a given real time sports, odds could be changed in the real time sports for that player.

Software as a service (or SaaS) is a method of software delivery and licensing in which software is accessed online via a subscription, rather than bought and installed on individual computers. Software as a service can be integrated into the embodiments in a variety of manners.

Synchronization of screens means synchronizing bets and results between devices, such as TV and mobile, PC and wearables. Synchronization of screens can be integrated into the embodiments in a variety of manners.

Automatic content recognition (ACR) is an identification technology to recognize content played on a media device or present in a media file. Devices containing ACR support enable users to quickly obtain additional information about the content they see without any user-based input or search efforts. To start the recognition, a short media clip (audio, video, or both) is selected. This clip could be selected from within a media file or recorded by a device. Through algorithms such as fingerprinting, information from the actual perceptual content is taken and compared to a database of reference fingerprints, each reference fingerprint corresponding to a known recorded work. A database may contain metadata about the work and associated information, including complementary media. If the fingerprint of the media clip is matched, the identification software returns the corresponding metadata to the client application. For example, during an in-play sports game a "fumble" could be recognized and at the time stamp of the event, metadata such as "fumble" could be displayed. Automatic content recognition (ACR) can be integrated into the embodiments in a variety of manners.

Joining social media means connecting an in-play sports game bet or result to a social media connection, such as a FACEBOOK® chat interaction. Joining social media can be integrated into the embodiments in a variety of manners.

Augmented reality means a technology that superimposes a computer-generated image on a user's view of the real world, thus providing a composite view. In an example of this invention, a real time view of the game can be seen and a "bet" which is a computer-generated data point is placed above the player that is bet on. Augmented reality can be integrated into the embodiments in a variety of manners.

Some embodiments of this disclosure, illustrating all its features, will now be discussed in detail. It can be understood that the embodiments are intended to be open ended in that an item or items used in the embodiments is not meant to be an exhaustive listing of such item or items, or meant to be limited to only the listed item or items.

It can be noted that as used herein and in the appended claims, the singular forms "a," "an," and "the" include plural references unless the context clearly dictates otherwise. Although any systems and methods similar or equivalent to those described herein can be used in the practice or testing of embodiments, only some exemplary systems and methods are now described.

FIG. 1 is a system for an AI sports betting algorithms engine. This system may be comprised of a live event 102, for example a sporting event such as a football game, basketball game, baseball game, hockey game, tennis match, golf tournament, eSports or digital game, etc. The live event 102 will include some number of actions or plays, upon which a user or bettor or customer can place a bet or wager, typically through an entity called a sportsbook. There are numerous types of wagers the bettor can make, including a straight bet, a money line bet, a bet with a point spread or line that bettor's team would need to cover, if the result of the game was the same as the point spread the user would not cover the spread, but instead the tie is called a push. If the user is betting on the favorite, they are giving points to the opposing side, which is the underdog or longshot. Betting on all favorites is referred to as chalk, this is typically applied to round robin, or other styles of tournaments. There are other types of wagers, including parlays, teasers, and prop bets, that are added games, that often allow the user to customize their betting by changing the odds and payouts they receive on a wager. Certain sportsbooks will allow the bettor to buy points, to move the point spread off of the opening line, this will increase the price of the bet, sometimes by increasing the juice, vig, or hold that the sportsbook takes. Another type of wager the bettor can make is an over/under, in which the user bets over or under a total for the live event, such as the score of American football or the run line in baseball, or a series of action in the live event 102. Sportsbooks have a number of bets they can handle, a limit of wagers they can take on either side of a bet before they will move the line or odds off of the opening line. Additionally, there are circumstance, such as an injury to an important player such as a listed pitcher, in which a sportsbook, casino or racino will take an available wager off the board. As the line moves there becomes an opportunity for a better to bet on both sides at different point spreads in order to middle and win both bets. Sportsbooks will often offer bets on portions of games, such as first half bets and half-time bets. Additionally, the sportsbook can offer futures bets on live events 102 in the future. Sportsbooks need to offer payment processing services in order to cash out customers. This can be done at kiosks at the live event 102 or at another location.

Further, embodiments may include a plurality of sensors 104 that may be used such as motion sensors, temperature sensors, humidity sensors, cameras such as an RGB-D Camera which is a digital camera capturing color (RGB) and depth information for every pixel in an image, microphones, a radiofrequency receiver, a thermal imager, a radar device, a lidar device, an ultrasound device, a speaker, wearable devices etc. Also, the plurality of sensors 104 may include tracking devices, such as RFID tags, GPS chips or other such devices embedded on uniforms, in equipment, in the field of play, in the boundaries of the field of play, or other markers on the field of play. Imaging devices may also be used as tracking devices such as player tracking that captures statistical information through real-time X, Y positioning of players and X, Y, Z positioning of the ball.

Further, embodiments may include a cloud 106 or communication network which may be a wired and/or a wireless network. The communication network, if wireless, may be implemented using communication techniques such as Visible Light Communication (VLC), Worldwide Interoperability for Microwave Access (WiMAX), Long Term Evolution (LTE), Wireless Local Area Network (WLAN), Infrared (IR) communication, Public Switched Telephone Network (PSTN), Radio waves, and other communication techniques known in the art. The communication network may allow ubiquitous access to shared pools of configurable system resources and higher-level services that can be rapidly provisioned with minimal management effort, for example over Internet, and relies on sharing of resources to achieve coherence and economies of scale, like a public utility, while third-party clouds enable organizations to focus on their core businesses instead of expending resources on computer infrastructure and maintenance. The cloud 106 may be communicatively coupled to a wagering network 108 which may perform real time analysis on the type of play and the result of the play. The cloud 106 may also be synchronized with game situational data, such as the time of the game, the score, location on the field, weather conditions, and the like which may affect the choice of play utilized. For example, in other exemplary embodiments, the cloud may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein.

Further, embodiments may include the wagering network 108 which may perform real time analysis on the type of play and the result of a play or action. The wagering network 108 (or cloud 106) may also be synchronized with game situational data, such as the time of the game, the score, location on the field, weather conditions, and the like which may affect the choice of play utilized. For example, in other exemplary embodiments, the wagering network 108 may not receive data gathered from the plurality of sensors 104 and may, instead, receive data from an alternative data feed, such as SportsRadar®. This data may be provided substantially immediately following the completion of any play and the data from this feed may be compared with a variety of team data and league data based on a variety of elements, including down, possession, score, time, team, and so forth, as described in various exemplary embodiments herein. The wagering network 108 can offer a number of software as a service managed services such as, user interface service, risk management service, compliance, pricing and trading service, IT support of the technology platform, business applications, game configuration, state based integration, fantasy sports connection, integration to allow the joining of social media, as well as marketing support services that can deliver engaging promotions to the user.

Further, embodiments may include a historical play database 110, that contains play data for the type of sport being played in the live event 102. For example, in American Football, for optimal odds calculation, the historical play data 110 may include meta data about the historical plays, such as time, location, weather, previous plays, opponent, physiological data, etc.

Further, embodiments may utilize an odds database 112 that contains the odds calculated by an odds calculation module 122, and the multipliers for distance and path deviation, and is used for reference by the base module 118 and to take bets from the user through a user interface and calculate the payouts to the user.

Further, embodiments may utilize a user database 114 which contains data relevant to all users of the system, which may include, a user ID, a device identifier, a paired device identifier, wagering history, and wallet information for each user.

Further, embodiments may include a cross database 116 which contains the output of a betting algorithms module 124, a cross module 126, an AI comparison module 128, a final odds module 130, and a machine learning module 132, as well as the mechanisms of the odds making formulas used to by the betting algorithms module 124 for all previous plays where the wagering network 108 has offered wagers on at least one outcome.

Further, embodiments may include the base module 118 that controls the order of operations of the other modules and databases on the wagering network 108, and well as enables the flow of information about the live event 102 from either the plurality of sensors 104, the cloud 106 or some combination of those. The base module 118 also enables the interaction of a wagering app 136 on a mobile device 134.

Further, embodiments may include a wagering module 120 that presents wagers available from the wagering network 108, to users of the wagering app 136, collects their wagers, and compares the wagers to the actual results and the odds in order to adjust the user's account balance in the user database 114.

Further, embodiments may include the odds calculation module 122 which utilizes historical play data to calculate odds for in-play wagers.

Further, embodiments may include the betting algorithms module 124 that calculates the odds on at least one possible outcome of a play inside of the live event 102, using at least one additional odds making formula than the one used by the odds calculation module 122.

Further, embodiments may include the cross module 126 that calculates at least one combination of the odds created by the different odds making formulas in the betting algorithms module 126.

Further, embodiments may include an AI comparison module 128 that calculates the correlation between each cross of odds making formulas in the cross database 116, as calculated by the cross module 126, and the final odds on each of the identified similar plays. In an example a trendline is plotted using the final odds on all identified similar plays. The odds calculated by crossing each odds making formula are then compared to that trendline.

Further, embodiments may include the final odds module 130 that identifies the odds making formula with the highest correlation to the most profitable odds on similar plays, then identifies the cross of that odds making formula's odds with another odds making formula is order to offer the best possible odds through the wagering module 122.

Further, embodiments may include the machine learning module 132 that compares the actual results of plays in the live event 102 with the odds created by each odds making formula and the crosses between those formulas in order to identify the odds that are the most profitable for the wagering network 108. The profitability of each of the odds making formula odds is compared to the most profitable odds calculated in order to identify the odds making formula most highly correlated with the most profitable odds on similar plays.

Further, embodiments may include the mobile device 134 such as a computing device, laptop, smartphone, tablet, computer, smart speaker, or I/O devices. I/O devices may be present in the computing device. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers. Devices may include a combination of multiple input or output devices, including, e.g., Microsoft KINECT, Nintendo Wii mote for the WIT, Nintendo WII U GAMEPAD, or Apple IPHONE. Some devices allow gesture recognition inputs through combining some of the inputs and outputs. Some devices allow for facial recognition which may be utilized as an input for different purposes including authentication and other commands. Some devices provide for voice recognition and inputs, including, e.g., Microsoft KINECT, SIRI for IPHONE by Apple, Google Now or Google Voice Search. Additional user devices have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices, display devices or group of devices may be augmented reality devices. The I/O devices may be controlled by an I/O controller. The I/O controller may control one or more I/O devices, such as, e.g., a keyboard and a pointing device, e.g., a mouse or optical pen. Furthermore, an I/O device may also contain storage and/or an installation medium for the computing device. In still other embodiments, the computing device may include USB connections (not shown) to receive handheld USB storage devices. In further embodiments an I/O device may be a bridge between the system bus and an external communication bus, e.g. a USB bus, a SCSI bus, a FireWire bus, an Ethernet bus, a Gigabit Ethernet bus, a Fiber Channel bus, or a Thunderbolt bus. In some embodiments the mobile device 134 could be an optional component and would be utilized in a situation in which a paired wearable device is utilizing the mobile device 134 as additional memory or computing power or connection to the internet.

Further, embodiments may include the wagering app 136, which is a program that enables the user to place bets on individual plays in the live event 102, and display the audio and video from the live event 102, along with the available wagers on the mobile device 136. The wagering app 136 allows the user to interact with the wagering network 108 in order to place bets and provide payment/receive funds based on wager outcomes.

Further, embodiments may include a mobile device database 138 that may store user data, historical play data, primary odds, data etc.

FIG. 2 illustrates the cross database 116. The cross database 116 contains the output of the betting algorithms module 124, the cross module 126, the AI comparison module 128, the final odds module 130, and the machine learning module 132, as well as the mechanisms of the odds making formulas used to by the betting algorithms module 124. The wagering network 108 may use some number of odds making formulas. In this example the wagering network 108 is using seven odds making formulas; the primary odds calculation output from the odds calculation module 122 based on the information available in the historical plays database 114, a primary value betting formula, a primary betting arbitrage formula, a betting bank formula, a unit stakes formula, a Kelly's criterion formula, and a Monte Carlo simulation. Formulas could be, for example, formulas that are in and of themselves computer program modules designed to find profitable sports betting opportunities. These formulas use vast amounts of data from past sporting matches so as to identify patterns, which can then be used to calculate the probability of certain sporting outcomes. In most cases, primary betting algorithms calculate the probability of various outcomes, and compare those probabilities to the odds offered by bookmakers, so as to identify bets that are worth placing. Primary betting algorithms can be divided into two types, depending on what they aim to achieve, these are, value betting formulas and betting arbitrage formulas. Primary value betting formulas are used on any bet where the odds for a certain outcome seem favorable, based on the probability of that outcome occurring. There are plenty of value betting formulas that collect data from past sporting matches, and use it estimate the probability of various outcomes. There are two parts to a value betting formula. First, the formula needs to identify value bets, which relates to the idea of expected value. Second, the formula needs to suggest an appropriately sized bet, depending on how confidently the bet could be made. Finding value bets is all about finding bets with an expected value greater than the stake of the bet. The expected value of a bet is the profit or loss you can expect to make when placing a bet over and over again. With a value bet, the odds provided are high enough that you should make a profit based on your estimation of the outcome's probability. In order to calculate the expected value of a bet—and thus identify value bets—betting formulas rely on past data. By looking at how often a certain outcome occurred in past matches, and analyzing the trends within those matches, formulas can predict what will happen in an upcoming match. For example, if a football team scores an average of 2.1 goals every game, you can expect them to score more than two goals in an upcoming match. Primary betting arbitrage formulas are used when advantage is sought for changing odds for a certain sporting outcome. For example, it usually is used when using "betting exchanges", where betters can place a bet at favorable odds, and then place a bet against their original bet (thereby guaranteeing a profit) once the odds have moved. These algorithms are the primary betting arbitrage that is used when "patterns in odds" can be determined. Many professional betters like to have a set betting bank (size varies depending on wealth) from which they place all their bets. This allows them to easily keep track of profit and loss because all winnings and losses are coming from the same bank. It also allows them to stake set proportions of their bank on bets which reflect their confidence in the selection's chances. Profit from the bank are periodically withdrawn or withdrawn when it reaches a certain amount to be used for non-betting purposes. For example, a user may have a betting bank of 1000 dollars, from which the user may withdraw profit every time the bank reaches 1500 dollars, or instead whatever profit has been made each three months. Formulas such as this would look at the database of players banks and could change the odds if there is lots of money in the bank vs. less money bank. Assigning unit stakes to bets can be useful as it makes the better more disciplined and less likely to over bet an event. Sometimes a maximum and minimum unit stake is used, from one unit to twenty units for example. Depending on the seriousness of the punter a unit may be 1, 10, 100 dollars or even more. These units are usually referred to as points. The more disciplined a better the smaller the band of units they will probably use. This makes them even less likely to over or under bet an outcome as the difference in confidence between units will be even more clearly defined in their mind. For example, a user may have stakes varying from 1 to 5 points. Each point is worth 20 dollars. A minimum bet for a user would be 20 dollars and a maximum bet would be 100 dollars. Formulas such as this would look at the database of players unit stakes and could change the odds if there are larger range of unit stakes vs less range of unit stakes. Kelly's Criterion is a formula that is used to determine how much of a bank should be risked on a given bet. The formula considers the odds of the bet and the probability that it will win and the probability that it will lose. This does have the advantage of ensuring the whole bank is never lost on a bet and helps to steadily increase the bank. A disadvantage of this is that there is no way of guaranteeing that money won't be lost. In fact, there is a 1/3 chance of halving the bankroll before it is doubled. A Monte Carlo simulation (MCS) is a system used by punters to help forecast the outcome of a wager. Working as a model of chance, the system uses a computer algorithm to run simulations in order to obtain the probability of a wager. This is done by converting uncertainties into probability by simulating a model numerous times to get a firm conclusion of probability. What MCS does is input the variables of a model into probability distributions and then randomly selects from them, essentially working in a similar way to wisdom of the crowd where the more one guesses, the closer to the result the system will be. For example, using the Monte Carlo method to determine whether the Patriots will win in a game versus the Giants. The system can add various parameters to the system, all of which could influence the result of the game. For example, weather, head-to-head form, injuries, or the starting quarterback could all have an impact. The system can then allow the function and system to run its course and spit out a more accurate probability of the Patriots winning. The betting algorithms module 124 may run some or all of the available betting formulas for each possible outcome of an available wager to populate the formula odds column of the cross database 116. In this example the table contains data related to the 35th play of an American football game between the New England Patriots and the Green Bay Packers being a run. In this example the odds returned by the odds calculation module 122 based on the information in the historical play database 110 are +300 on a run. In this example the MCS returned odds of +400 on the same play resulting in a run. Each available formula is crossed against each other formula by the cross module 126 to create blended odds. Those odds could be blended simply by taking the midpoint between the two odds but could also be weighted towards one or the other or mixed in some other fashion.

In this example, the cross between the primary odds calculation odd of +300 and the MCS odds of +400, is +350. The AI comparison module 128 populates each cross cell with a correlation coefficient relating to each cross of odds being correct in the context of this play. In this example, the cross between the primary betting arbitrage odds formula of +200 and the primary value betting formula of +350 has a correlation coefficient of 0.61 with the final odds in similar historical plays. Similar plays can be defined in a number of different ways based on characteristics of the play, game, players involved, weather, etc. In this example, similar plays are defined as having the same down and distance to go in the same quarter of a game. Finally, the machine learning module 132 may compare the final odds to the actual result and to the odds produced by each odds making formula.

FIG. 3 illustrates the base module 118. The process begins with the base module 118 polling, at step 300, the cloud 106 or the sensors 104 for new data related to the live event 102. If there is not data for the live event 102 the module returns, at step 302, to step 300 and continues to poll for new data. If there is data from the live event 102 the module prompts, at step 304, the odds calculation module 122. The module then prompts, at step 306, the betting algorithms module 124 which calculates odds on the next play in the live event 102 using at least two different odds making formulas. The module then prompts, at step 308, the cross module 126 to blend the results of each of the odds making formulas used by the odds calculation module 122. The module then prompts, at step 310, the AI comparison module 128 to calculate the correlation between each cross off odds making formulas and the final odds in a similar play. The module then prompts, at step 312, the final odds module 130 to select the odds from the cross database 116 to offer through the wagering module 120. The module then prompts, at step 314, the wagering module 120 and provides the final odds selected by the final odds module 130. The module then prompts, at step 316, the machine learning module 132 which compares the final odds selected by the final odds module 130 to the actual results. The same comparison is made between the odds calculated by each other odds making formula and the actual result in similar plays. The module then returns to step 300 to continue polling data for the live event 102.

FIG. 4 illustrates the betting algorithms module 124. The process begins with the betting algorithms module 124 receiving, at step 400, a prompt from the base module 118 that there is a play in the live event 102 where wagers may be placed upon at least one outcome. The module may then retrieve, at step 402, data from the historical play database 110 needed by the odds making formulas. It should be obvious that data beyond historical play data may be used by one or more of the odds making formulas. This data could include data from the user database 114 about the users and their wagering history, current account balances, etc. The data may also include 3rd party analytics or other information related to the live event 102, wagers, or users. The module then identifies, at step 404, the odds making formulas in the cross database 116 that are available to calculate odds to offer on a play in the live event 102. In this example all of the formulas in the cross database 116 are used for each wagering option, but it should be obvious that different odds making formulas could be used, or only a subset of the available formulas could be used, and that subset could also change based on the context of the live event 102 or for other reasons, such as the current handle or amount of exposure of the wagering network 108. The module then calculates, at step 406, the odds on the at least one outcome of a play in the live event 102 using the first available odds making formula. The module will loop back to this step for each odds making formula that will be used to calculate the odds. The module then writes, at step 408, the calculated odds to the cross database 116. The module then determines, at step 410, if there are more odds making formulas available in the cross database 116 that have not yet been used to calculate the odds on the at least one outcome of a play in the live event 102. If there are more odds making formulas available, the module returns to step 406. If there are no more odds making formulas that are to be used at this time, the module returns, at step 412, to the base module 118.

FIG. 5 illustrates the cross module 126. The process begins with receiving, at step 500, a prompt from the base module 120 that odds have been calculated using at least two odds making formulas by the betting algorithms module 124. The module then retrieves, at step 502, the odds calculated by the betting algorithms module 124 from the cross database 116. The module then calculates, at step 504, the cross between each set of calculated odds. In this example, the odds calculated by the primary value betting formula +350 on the New England Patriots to run on the 35th play of their game against the Green Bay Packers. The MCS calculated odds of +400 on the same play. The cross between these two odds is calculated as +375. While the midpoint between the two odds is used as the cross in this example, it should be obvious that there are different ways to calculate the cross between the two odds. For example, one of the two could be weighted more heavily than the other. The lower odds, or higher odds could be favored by default. The odds closer to the primary odds calculation could be favored, or other variations of crossing the odds. This is done for each set of odds created against every other set of odds created. When all of the crosses between each set of calculated odds have been calculated and written to the cross database 116, the module then returns, at step 506, to the base module 118.

FIG. 6 illustrates the AI comparison module 128. The process begins with the module receiving, at step 600, a prompt from the base module 118 that there is a play in the live event 102 that wagers may be placed upon at least one outcome. The module then retrieves, at step 602, plays similar to the current play that odds are being calculated for, from the historical play database 110. Similar plays can be defined in a number of different ways. In this example, a similar play is a play with the same down and distance to go, in the same half of a game. It should be obvious that a similar play can be defined in other ways, such as with a similarity score, or other plays involving the same offense or the same defense, or based on the stadium the game is played in, or the current weather, or the score of the game, or in a number of other ways. The module then retrieves, at step 604, the odds calculated by the available ordaining formulas for the identified similar plays. The odds created by crossing the odds created by each odds making formula is also retrieved from the cross database 116. The module then calculates the correlation between each cross of odds making formulas in the cross database 116, as calculated by the cross module 126, and the final odds on each of the identified similar plays. In this example a trendline is plotted using the final odds on all identified similar plays. The odds calculated by crossing each odds making formula are then compared to that trendline. If the odds for a particular cross of odds making formulas exactly matches the final odds on all of the previous plays the correlation between that cross of odds making formulas and the final odds would have an r-squared value of 1.0. The greater the difference between the two data sets, the closer to zero the r-squared value becomes, indicating a lower correlation. This is done in order to identify the cross of odds making formulas that is most correlated with the final odds in the current context. In this example, the cross between the betting bank formula and the Kelly's criterion formula has the lowest correlation to the final odds on similar plays, with a r-squared value of 0.48. The cross between the unit stakes odds and the primary odds calculation has the highest correlation to the final odds with a r-squared value of 0.79. While correlation is used in this example, it should be obvious that other types of comparisons can be made, such as convolution, regression, etc. The calculated correlation coefficients are then written, at step 608, to the cross database 116. The module then returns, at step 610, to the base module 118.

FIG. 7 illustrates the final odds module 130. The process begins with the module receiving, at step 700, a prompt from the base module 118 that there is a play in the live event 102 where wagers may be placed upon at least one outcome. The module then retrieves, at step 702, the output of the machine learning module on the similar historical plays for each of the odds making formulas. The module then identifies, at step 704, the odds making formula with the highest r-squared value, indicating that it is the odds making formulas who's previous results are the most highly correlated with the actual results of the identified similar previous plays. In this example, the odds returned by the unit stakes formula were the most highly correlated to the actual results of plays similar to the current play, as represented by the r-squared value of 0.82. This is calculated by the machine learning module 132 which may examine the final odds offered on the wagering network 108, and the odds of some or all of the available odds making formulas, on all previous plays that are similar to the current play. The module then identifies, at step 706, the cross with the identified odds making formula that has the highest correlation who's previous results are the most highly correlated to the final odds, as indicated by the r-squared value that is calculated by the AI comparison module 128. In this example, the unit stakes formula was identified at step 704, and the cross with the unit stakes formula that has the highest r-squared value is the primary odds calculations, with a r-squared of 0.79. This cross has odds of +350 on a run on the next play. The odds identified, in this example +350, is sent, at step 708, to the base module 118.

FIG. 8 illustrates the machine learning module 132. The process begins with receiving, at step 800, a prompt from the base module 118 that there is a play in the live event 102 where wagers have been placed upon at least one outcome. The module then retrieves, at step 802, the similar plays used by the AI comparison module 128 from the historical plays database 110. The module then retrieves, at step 804, the cross tables for the plays identified at step 802 from the cross database 116. The module then retrieves, at step 806, the wagers placed on the identified plays from the user database 114. The module then calculates, at step 808, the odds that would produce the most profit, or least loss, for the wagering network 108 based on the amount wagered on that play. This may be done by using the amount of money wagered on a given outcome, the actual outcome, and the odds produced by each of the odds making formulas in the betting algorithms module 124. It should be obvious that there are additional variable that may be considered, such as the impact of the different odds on the action that is placed on a given outcome. The module then calculates, at step 810, the correlation between the odds created by each odds making formula and the most profitable odds for each of the identified historical plays that are similar to the play that was just wagered on through the wagering module 120. The correlation coefficient, represented as a r-squared value between zero and one, is between the profitability of each odds making formula. In this example the primary value betting formula was less correlated with the most profitable odds, with a r-squared value of 0.55, than the unit stakes formula, which had a r-squared value of 0.82 when correlated with the most profitable odds on all identified similar plays in the historical plays database 110. The module then writes, at step 812, the correlation, expressed as a r-squared value in this example, to the table for each identified similar play in the cross database 116. It should be obvious that there are other ways in which machine learning, or AI can be applied to the historical performance of odds in a given context. For example, instead of the odds that would create the most profit for the wagering network 108, the correlation could be to the odds that created the greatest handle, or the largest number of wagers. The module then returns, at step 814, to the base module 118.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art.

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A method of calculating odds on at least one play in a live sporting event, comprising:

receiving data related to the live sporting event on a wagering network;

calculating at least first odds on at least one play in the live sporting event using at least a first odds calculation formula;

calculating at least second odds on the at least one play in the live sporting event using at least a second odds calculation formula independent of the first odds;

calculating, with an artificial intelligence module, odds on at least one outcome of the at least one play in the live sporting event using a combination of the first odds calculation formula and the at least second odds calculation formula;

determining, with a machine learning module, final odds for wagers based on the combination of the first odds calculation formula and the at least second odds calculation formula meeting a value;

offering the final odds for the wagers to at least one device of a user; and receiving, from the at least one device of the user, a selection of at least one wager based on the final odds provided on the at least one device.

2. The method of calculating odds on at least one play in the live sporting event of claim 1, wherein the at least two odds calculation formulas are informed by previous live sporting events and/or plays inside of the similar, previous live sporting.

3. The method of calculating odds on at least one play in the live sporting event of claim 2, further comprising:

retrieving data from a historical play database containing data regarding similar, previous live sporting events.

4. The method of calculating odds on at least one play in the live sporting event of claim 3, further comprising:

retrieving third party analytics related to the live sporting event.

5. The method of calculating odds on at least one play in the live sporting event of claim 2, further comprising:

identifying similar, previous live sporting events and/or plays inside of the similar, previous live sporting events to the current live sporting event.

6. The method of calculating odds on at least one play in the live sporting event of claim 1, further comprising:

plotting a trendline of odds determined by the first odds calculation formula and the at least one second odds calculation formula; and determining the value based on one or more calculated correlation coefficients.

7. The method of calculating odds on at least one play in the live sporting event of claim 6, further comprising:

offering the final odds based on a determination that the at least one outcome of the at least one play in the live sporting event is most similar to a correlated outcome of similar, previous live sporting events and/or plays inside of the similar, previous live sporting events.

8. The method of calculating odds on at least one play in the live sporting event of claim 1, further comprising:

modifying the final odds based on inputted wagers on the at least one play in the live sporting event.

9. The method of calculating odds on at least one play in the live sporting event of claim 1, wherein the offered final odds are one of a combination of results of the first odds calculation formula and results of the at least second odds calculation formula.

10. The method of calculating odds on at least one play in the live sporting event of claim 9, further comprising:

weighting the results of the at least first odds calculation formula or weighting the results of the at least second odds calculation formula.

11. The method of calculating odds on at least one play in the live sporting event of claim 1, wherein the offered final odds are one of results of the first odds calculation formula or results of the at least second odds calculation formula.

* * * * *